(12) United States Patent
Patra

(10) Patent No.: US 7,474,147 B2
(45) Date of Patent: Jan. 6, 2009

(54) FREQUENCY SHIFT KEYING SIGNAL DEMODULATOR METHOD AND APPARATUS

(75) Inventor: Gopinath Patra, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 615 days.

(21) Appl. No.: 11/224,776

(22) Filed: Sep. 13, 2005

(65) Prior Publication Data

US 2006/0062332 A1  Mar. 23, 2006

Related U.S. Application Data

(60) Provisional application No. 60/611,250, filed on Sep. 17, 2004.

(51) Int. Cl.
*H03D 3/00* (2006.01)

(52) U.S. Cl. .................. 329/300; 370/516; 370/517; 708/314; 375/150; 375/272; 375/340; 375/343; 375/334

(58) Field of Classification Search ............... 329/300; 375/150, 272, 340, 343, 334; 370/516, 517; 708/314

See application file for complete search history.

(56) References Cited

U.S. PATENT DOCUMENTS 4,234,930 A * 11/1980 Campbell ................. 708/314
5,353,301 A * 10/1994 Mitzlaff ................... 375/152
5,627,856 A *  5/1997 Durrant et al. ............ 375/150
5,774,492 A *  6/1998 Orlowsik et al. .......... 375/142
6,151,367 A * 11/2000 Lim ........................ 375/326
6,900,675 B2 *  5/2005 Briones .................... 327/147
7,397,300 B2 *  7/2008 Quinlan et al. ........... 329/300

* cited by examiner

*Primary Examiner*—Arnold Kinkead
(74) *Attorney, Agent, or Firm*—Prakash Nama; Global IP Services, PLLC

(57) ABSTRACT

A method and apparatus for a frequency shift keying (FSK) demodulator use a configuration to improve the autocorrelation for better receiver performance. The demodulator uses parallel first and second lines connected to the same input signal, the first line having a delay element to provide an integer-delay of M, the second parallel line having a filter for causing a group delay of $\tau+M$ where $\tau$ is fractional, and a multiplier for receiving the signals from said first and second lines and generating a resultant signal from which a base band signal can be recovered. The resultant signal is passed through a low pass base band filter to recover the base band signal. $\tau$ may have a value of 3.25 and M may be 6. The demodulator may selectively be implemented in caller ID service and in low end modems chosen from a group comprising V.21, Bell 103, V.23 and Bell 202A modems.

30 Claims, 6 Drawing Sheets

FREQUENCY SHIFT KEYING SIGNAL DEMODULATOR METHOD AND APPARATUS

RELATED APPLICATIONS

Benefit is claimed under 35 U.S.C. 119(e) to U.S. Provisional Application Ser. No. 60/611,250, entitled "System, apparatus, and Method for frequency shift keying Signal Demodulator" by Gopinath Patra, filed Sep. 17, 2004, which is herein incorporated in its entirety by reference for all purposes.

FIELD OF THE INVENTION

The present invention relates generally to FSK (frequency shift keying). More particularly, the invention relates to a modification in a conventional FSK demodulation technique.

BACKGROUND OF THE INVENTION

FSK is used is many low-end modems like (V.21, Bell103, V.23, Bell202A) and Caller ID service which is part of telephone services. Caller ID receivers are subjected to stringent tests as per TIA/EIA-777. Non-coherent FSK receivers are generally known to be simpler than other QAM receivers. In the absence of a complex carrier and clock recovery block, the receiver performance depends heavily on the demodulation. The internal clock running at the baud rate is recovered from the demodulated signal. This internal clock indicates when to slice the signal for data bits and is important for receiver performance. Improving the non-coherent FSK receiver without significantly increasing the MIPS and memory requirement becomes a challenge when the receiver needs to be relatively simple. What is needed is a simple improvement in a conventional demodulator, providing the extra performance without increasing complexity.

SUMMARY OF THE INVENTION

The invention teaches an FSK demodulation method and apparatus with improved autocorrelation between a received signal and a time-shifted version of the signal without increasing the complexity of the demodulation configuration. An embodiment of the invention resides in a frequency shift keying (FSK) demodulation method using improved correlation, comprising: using a demodulator wherein autocorrelation between a signal and a time-shifted version of the signal is used, said modulator having a base band signal as an output; configuring the demodulator to include first and second lines parallel connected to the same input signal, said first line having a first signal with a delay M for a signal coming into the demodulator, said second line having a second signal passing through a filter with a group delay of $\tau+M$ where $\tau$ is a fraction, the method including the step of multiplying said first and second signals to obtain a resultant signal from which said base band signal may be obtained. The resultant signal may be passed through a low pass base band filter to obtain the base band signal. The delay filter may be derived using one polyphase component of a SINC interpolating filter giving a fractional delay close to a fractional delay $\tau+M$. The delay M might be configured to depend on a length of the SINC interpolating filter.

The method of the invention may be implemented in low end modems chosen from a group comprising V.21, Bell 103, V.23 and Bell 202A modems.

A second embodiment resides in a frequency shift keying demodulation apparatus, comprising: an automatic gain control (AGC) block connected to receive an analog front end signal; a demodulator connected to a signal from said AGC block and configured to provide an output into a slicer which provides a digital symbol after comparing said output against a threshold; a baud recovery clock which is connected to recover a corrected sample sliced from said demodulator output; the demodulator including first and second parallel connected lines, the first parallel connected line having a first signal with a group delay M for said signal from the AGC block, the second parallel connected line having a delay filter with a second signal having a delay of $\tau+M$ where $\tau$ is a fraction.

The demodulation apparatus advantageously includes a multiplier for multiplying signals in the first and second lines connected in parallel. Expediently, the demodulator includes a low pass base band filter through which a signal in the first and second parallel connected lines after multiplication is passed.

Also included herein is an article comprising a storage medium having instructions thereon which when executed by a computing platform will result in execution of a frequency shift keying (FSK) demodulation method using improved correlation, as stated above. It has been experimentally determined that there is an improvement of about 1.5 dB in the performance of the demodulator by using the configuration and method as taught by the invention.

BRIEF DESCRIPTION OF THE DRAWING

A more detailed understanding of the invention maybe had from the following description of a preferred embodiment, given by way of example and not limitation, to be understood in conjunction with the accompanying drawing wherein.

DETAILED DESCRIPTION

In the following detailed description of an exemplary embodiment of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims and their equivalents.

Standard demodulation techniques are known for demodulation of FSK signals. One of the standard techniques is the frequency discrimination method, which converts a change in frequency to a change in amplitude. Most of the discriminators find the autocorrelation between the signal and a time-shifted version of the signal to demodulate the FSK signal.

Described herein is a method and apparatus with enhanced autocorrelation for better receiver performance, using the principles of the invention.

Figure 1:
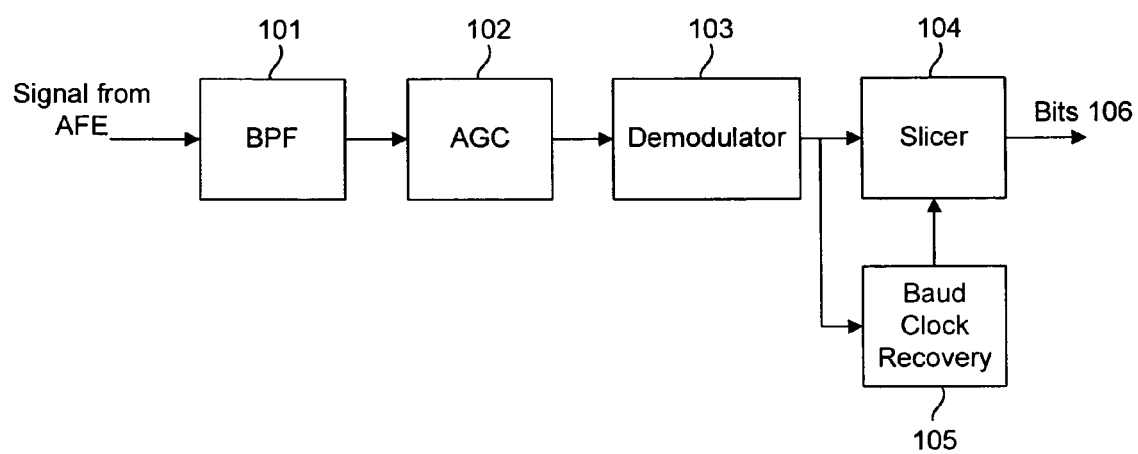
FIG. 1 illustrates an FSK receiver including all major functional blocks.

FIG. 1 shows a FSK receiver with certain functional bocks. The signal from the analog front end is passed through a band pass filter (example, BPF 101) to remove out-of-band noise and near-end echo, incase of full-duplex modems. The AGC (automatic gain control) function is used to compensate for the channel attenuation and brings up the signal power to a reference level. The demodulator 103 then converts the signal to the original base band signal transmitted. This signal is then used by the baud clock recovery block 105, which recovers the correct sample to slice. The slicer 104 is a comparator, which gives out bits 106 in the form of a symbol (0 or 1) after comparing the sample against a fixed threshold. Details of the functioning of the FSK receiver in FIG. 1 are intelligible to those who are skilled in the art.

Figure 2:
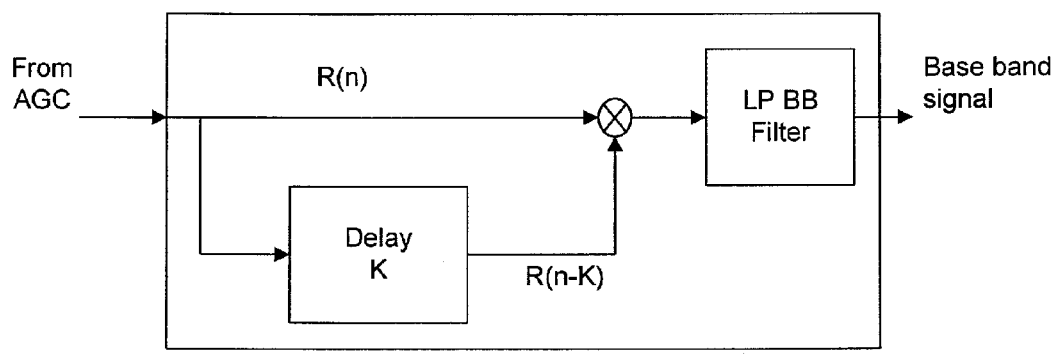
FIG. 2 illustrates the configuration of a conventional demodulator.

A conventional demodulator illustrated in FIG. 1 is shown in FIG. 2. The conventional demodulator shown in FIG. 2 has two parallel lines, the first having the received signal and the second line including a delay element to cause a delay of K. The signals from the two lines are multiplied and passed through a low pass base band filter to obtain the base band signal.

Let the received signal be R(n)

$$R(n) = \cos[(\omega_c \pm \delta\omega) \times n + \phi] \quad (1)$$

wherein, $\omega_c$ is the 2*pi*carrier frequency, $\delta\omega$ is the 2*pi*change in carrier frequency with binary digits, and $\phi$ is the initial phase of the signal. It is noted that the frequency and phase parameter are all in digital domain.

The instantaneous frequency of the signal may be $(\omega_c + \delta\omega)/2\pi$ or $(\omega_c - \delta\omega)/2\pi$ based on the binary digit sent.

The time-delayed signal will be $$R(n-K) = \cos[(\omega_c \pm \delta\omega) \times (n-K) + \phi] \quad (2)$$

The product of these signals 1 and 2 will be $$R(n)R(n-K) = \cos[(\omega_c \pm \delta\omega)K] + \cos[2(\omega_c \pm \delta\omega)n - (\omega_c \pm \delta\omega)K + 2\phi] \quad (3)$$

The product consists of 2 components, namely,
1. A dc component, $\cos[(\omega_c \pm \delta\omega)K]$ which changes with the binary data.
2. The other component $\cos[2(\omega_c \pm \delta\omega)n - (\omega_c \pm \delta\omega)K + 2\phi]$ is around twice the carrier frequency.

If the product signal (3) is low pass filtered (equivalent to integration) the high frequency component will be removed and only the low frequency base band signal will be left.

The DC value of the low pass filtered signal $\cos[(\omega_c \pm \delta\omega)K]$ will depend on the time delay and the binary digit transmitted.

Binary 1: The DC value will be $\cos[(\omega_c - \delta\omega)K] = \cos(2\pi f_1 K)$ (4)

Binary 0: The DC value will be $\cos[(\omega_c + \delta\omega)K] = \cos(2\pi f_0 K)$ (5)

where $f_1$ and $f_0$ are mark and space frequencies represented in the digital domain. Let the absolute difference between the DC values be d(k).

d(k) may be expressed as $d(K) = |\cos(2\pi f_1 K) - \cos(2\pi f_0 K)|$ (6)

To minimize the probability of error, the difference between the DC values corresponding to the binary digits should be maximized, with K being an integer not exceeding the number of samples in a baud. It is desirable that K should be as small as possible for the equations to hold good. Typically K should be less than half the number of samples in a baud.

If K can be made to vary continuously, then equation (6) is modified as $$d(\tau) = |\cos(2\pi f_1 \tau) - \cos(2\pi f_0 \tau)| \quad (7)$$

where $\tau$ is the continuous form of K. It is also noted that $d(\tau) \geq d(k)$ since $\tau$ can be varied continuously.

The limits on the value of $\tau$ are the same as for K for the equations to hold good.

In most of the cases of $f_0$ and $f_1$, $d(\tau)$ turns out to be better than d(k).

Figure 3:
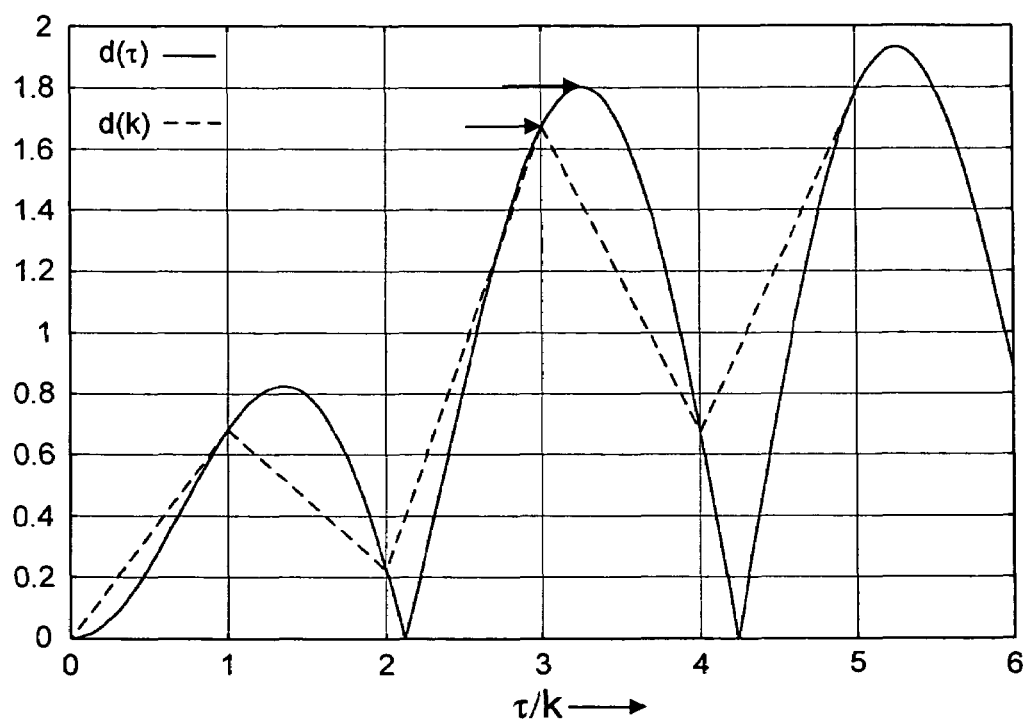
FIG. 3 shows the analysis results of implementing the invention in a caller ID receiver unit.

If the operating parameters of a caller ID (for example, V.23) receiver working at 7.2 KHz are applied to the equations (6) and (7), the results as shown in FIG. 3 are obtained.

FIG. 3 illustrates the values of $d(\tau)$ and d(k) (which are represented on the Y axis) for different values of $\tau/k$ (which are represented along the X axis).

If the peak close to 3 is considered, then $d(\tau)$ is greater than d(k).

$\tau$ may be approximated to a K if the signal is highly oversampled. But this is may not be feasible in terms of computation required.

Instead, the signals being correlated may be delayed by a value close to $\tau$.

Figure 4:
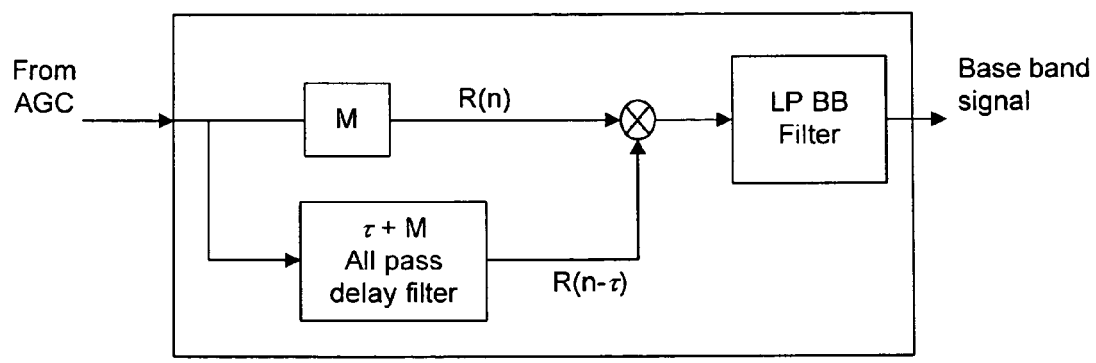
FIG. 4 illustrates an exemplary configuration of a demodulator in which the invention is implemented.

FIG. 4 shows an exemplary modified demodulator structure, and shows a modified demodulator arrangement based on the discussion above. The demodulator is configured to include first and second parallel connected lines connected to the same input signal, the first line having a first signal with a delay M for the input signal coming into the demodulator, the second line generating a second signal after passing the input signal through a delay filter with a group delay of $\tau + M$ where $\tau$ is fractional. In FIG. 4, the delay filter is illustrated as an "All pass delay filter" As shown, the signals through the first and second parallel connected lines of the demodulator are multiplied and passed through a low pass base band filter to retrieve the base band signal.

The signal coming into the demodulator is delayed in the second line by a value close to $\tau + M$, preferably using a delay filter which is designed as desired. The filter has a group delay response, which is close to $\tau + M$ at least in the band of interest. M is the additional group delay that the filter might provide over and above the desired delay of $\tau$.

The delay filter should have a unity gain at least in the band of interest.

The filter may be designed using one of the polyphase components of a SINC interpolating filter, which gives a fractional delay close to the fractional delay in ($\tau + M$). M in this case depends on the length of the SINC filter.

Alternatively, the delay filter can be designed using any filter design tool that can design filters with an arbitrary amplitude and group delay response.

With further reference to FIG. 4, R (n) in the first parallel line is the original signal delayed by an integer delay M. It is noted that R (n−$\tau$) in the second parallel line is the original signal delayed by $\tau + M$. The relative shift in time between these 2 signals is $\tau$. The signals in the first and second parallel lines, as explained earlier, are multiplied and low pass filtered to get the base band signal.

The choice of $\tau$ is made from the plot of d($\tau$). It is also noted that M should ideally have been zero.

As an exemplary application, the design for a V.23/Bell 202A/CallerID receiver working at a sampling rate of 7.2 KHz is discussed below. At 1200 bps, the samples per baud will be only 6. From FIG. 3 which gives the d($\tau$) plot for the receiver, it can be clearly seen that a maxima lies around $\tau=3$. The other maxima at around $\tau=6$ cannot be chosen because of the reason mentioned earlier. We also see that $\tau=3.25$ is a good approximation of the maxima. A filter is then chosen which has a group delay response of (M+3.25).

Based on the knowledge of up-sampling filters, a poly phase component of a SINC up-sampling filter, of order 80 that up-samples by 4 can be chosen. The order of the filter may be reduced based on the accuracy of $\tau$ required. For example, the $4^{th}$ poly phase component of the filter described above has a group delay of 9.25 samples in the band of interest. This yields the value of M as 6.

Figure 5:
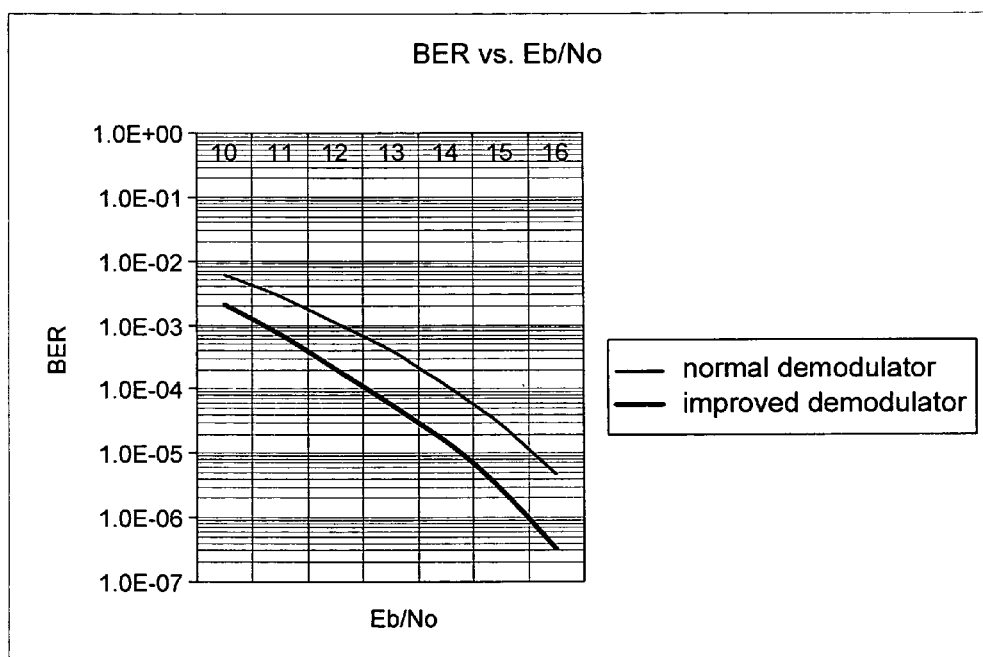
FIG. 5 illustrates the performance result of implementing the invention in a caller ID receiver unit; and, FIG. 6 illustrates a general purpose computing platform which may be used in implementing the invention.

The performance of a V.23/Bell 202A/CallerID receiver as an example was evaluated with and without the inventive improvement and is shown in FIG. 5.

It can be seen from the plot in FIG. 5 that the improvement in performance is about 1.5 dB across the range of $E_b/N_0$ simulated for. It is to be noted that $E_b$ is the energy per bit, and $N_0$ is the noise variance at the input to the receiver.

The above-described modification to a conventional FSK signal demodulator improves the performance of a FSK receiver. The demodulator is modified with filters to give a fractional sample shift, thereby increasing differences in the auto-correlation values of binary 0 and 1. This helps the slicer 104 (see FIG. 1) to make a better binary decision.

Figure 6:
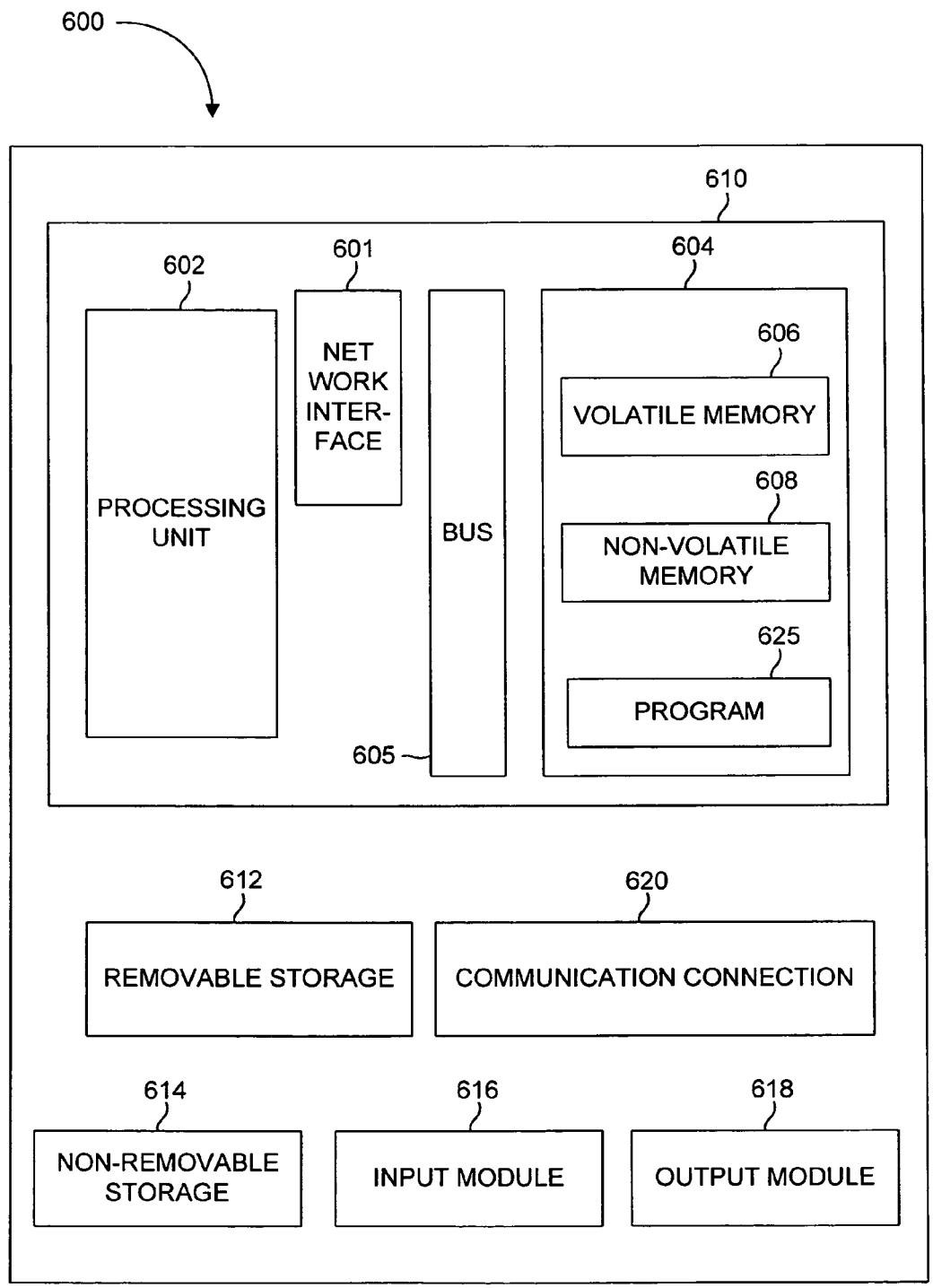

The various operations within the FSK receiver may be coordinated and controlled by a general purpose computing platform as illustrated in FIG. 6, or any other suitable arrangement.

Various embodiments of the present subject matter can be assisted by software, which may be run in the environment shown in FIG. 6 or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. It is also noted that the embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

FIG. 6 and the following discussion are intended to provide a brief, general description of a suitable computing environment in which certain embodiments of the inventive concepts contained herein may be implemented.

A general computing device 600 may include a computer 610, a processing unit 602, memory 604, removable storage 612, and non-removable storage 614. Computer 610 additionally includes a bus 605 and a network interface (NI) 601.

Computer 610 may include or have access to a computing environment that includes one or more user input modules or devices 616, one or more output modules or devices 618, and one or more communication connections 620 such as a network interface card or a USB connection. The one or more user input devices 616 can be a touch screen and a stylus and the like. The one or more output devices 618 can be a display device of computer, computer monitor, TV screen, plasma display, LCD display, display on a touch screen, display on an electronic tablet, and the like. The computer 610 may operate in a networked environment using the communication connection 620 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 604 may include volatile memory 606 and non-volatile memory 608. A variety of computer-readable media may be stored in and accessed from the memory elements of computer 610, such as volatile memory 606 and non-volatile memory 608, removable storage 601 and non-removable storage 614. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like, chemical storage, biological storage, and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 602 of the computer 610. For example, a computer program 625 may include machine-readable instructions capable of handling a signal for an FSK receiver according to the teachings of the described embodiments of the present subject matter. In one embodiment, the computer program 625 may be included on a CD-ROM and loaded from the CD-ROM to a hard drive in non-volatile memory 608. The machine-readable instructions cause the computer 610 to decode according to the various embodiments of the present subject matter.

The foregoing is the description of exemplary implementations of the method and apparatus for configuring an FSK demodulator with improved autocorrelation between the signal and a time-shifted version of the signal to demodulate the FSK signal. The above-described implementation is intended to be applicable, without limitation, to situations where an improved FSK receiver is sought, with an altered configuration for the demodulator. The description hereinabove is intended to be illustrative, and not restrictive.

The various embodiments of the FSK demodulator with improved autocorrelation described herein are applicable generally to any FSK system, and the embodiments described herein are in no way intended to limit the applicability of the invention. In addition, the techniques of the various exemplary embodiments are useful to the design of any hardware implementations of software, firmware, and algorithms in the context of decoding in general. Many other embodiments will be apparent to those skilled in the art. The scope of this invention should therefore be determined by the appended claims as supported by the text, along with the full scope of equivalents to which such claims are entitled.

The invention claimed is:

1. A frequency shift keying (FSK) demodulation method using improved correlation, comprising:
   using a demodulator wherein autocorrelation between a signal and a time-shifted version of the signal is used, said modulator having a base band signal as an output;
   configuring the demodulator to include first and second parallel connected lines, said first line having a first signal with a group delay M for a signal coming into the demodulator, said second line having a second signal passing through a delay filter with a group delay of $\tau+M$ where $\tau$ is fractional,
   the method including the step of multiplying said first and second signals to obtain a resultant signal from which said base band signal may be obtained.

2. The method as in claim 1, including the step of passing said resultant signal through a low pass base band filter to obtain said base band signal.

3. The method as in claim 2, wherein said delay filter is derived from one polyphase component of a SINC interpolating filter giving a fractional delay close to a fractional delay $\tau+M$.

4. The method as in claim 3, where M depends on a length of the SINC interpolating filter.

5. The method as in claim 2, where said delay filter is configured using a filter design tool that can design filters with an arbitrary amplitude and group delay response.

6. The method as in claim 1 where $\tau$ is approximately 3.

7. The method as in claim 1 where $\tau$ is 3.25 and M is approximately 6.

8. The method as in claim 1, implemented in a caller ID service unit.

9. The method as in claim 1 implemented in low end modems.

10. The method as in claim 9, wherein the modems are chosen from a group comprising V.21, Bell 103, V.23 and Bell 202A modems.

11. A frequency shift keying demodulation apparatus, comprising:
   an automatic gain control (AGC) block connected to receive an analog front end signal;
   a demodulator connected to a signal from said AGC block and configured to provide an output into a slicer which provides a digital symbol after comparing said output against a threshold;
   a baud recovery clock which is connected to recover a corrected sample sliced from said demodulator output;
   said demodulator including first and second parallel connected lines, said first parallel connected line having a first signal with a group delay M for said signal from the AGC block, said second parallel connected line having a delay filter with a second signal having a delay of $\tau+M$ where $\tau$ is a fraction.

12. The apparatus as in claim 11, including a band pass filter interposed between said AGC block and said analog front end signal.

13. The apparatus as in claim 11, wherein said demodulator includes a multiplier for multiplying signals in said first and second parallel connected lines.

14. The apparatus as in claim 13, wherein said demodulator includes a low pass base band filter through which signals in said first and second parallel connected lines after multiplication are passed.

15. The apparatus as in claim 11, wherein said delay filter in said second parallel connected line has a unity gain.

16. The apparatus as in claim 12, wherein said delay filter is configured using one polyphase component of a SINC interpolating filter giving a fractional delay close to a fractional delay $\tau+M$.

17. The apparatus as in claim 16, where M depends on a length of the SINC interpolating filter.

18. The apparatus as in claim 12, where said delay filter is configured using a filter design tool that can design filters with an arbitrary amplitude and group delay response.

19. The apparatus as in claim 11, where $\tau$ is approximately 3.

20. The apparatus as in claim 19, where $\tau$ is 3.25 and M is approximately 6.

21. The apparatus as in claim 11, implemented in a caller ID service unit.

22. The apparatus as in claim 11 implemented in low end modems.

23. The apparatus as in claim 22, wherein the modems are chosen from a group comprising V.21, Bell 103, V.23 and Bell 202A modems.

24. An article comprising a storage medium having instructions thereon which when executed by a computing platform will result in execution of a frequency shift keying (FSK) demodulation method using improved correlation, comprising:
   using a demodulator wherein autocorrelation between a signal and a time-shifted version of the signal is used, said modulator having a base band signal as an output;
   configuring the demodulator to include first and second parallel connected lines, said first line having a first signal with a group delay m for a signal coming into the demodulator, said second line having a second signal passing through a delay filter with a delay of $\tau+M$ where $\tau$ is fractional,
   the method including the step of multiplying said first and second signals to obtain a resultant signal from which said base band signal may be obtained.

25. The article as in claim 24, the method including the step of passing said resultant signal through a low pass base band filter to obtain said base band signal.

26. A frequency shift keying (FSK) demodulation apparatus using autocorrelation and having an input end for receiving an analog input signal and an output end for delivering a demodulated signal, comprising first and second lines connected in parallel, said first line having a delay element to provide an integer-delay of M, said second parallel line having a delay filter for causing a delay of $\tau+M$ where $\tau$ is fractional, and an integrator for receiving the signals from said first and second lines and generating a resultant signal from which a base band signal can be recovered.

27. The FSK apparatus as in claim 26, wherein said integrator comprises a multiplier.

28. The FSK apparatus as in claim 27, including a slicer connected to said output end which with assistance from a baud clock recovery, produces a digital symbol after comparing said base band signal with a fixed threshold.

29. The FSK apparatus as in claim 27, selectively implemented caller ID service and in low end modems chosen from a group comprising V.21, Bell 103, V.23 and Bell 202A modems.

30. The FSK apparatus as in claim 26, wherein $\tau$ is 3.25 and M is 6.

* * * * *